(12) United States Patent
Lee et al.

(10) Patent No.: US 11,089,233 B2
(45) Date of Patent: Aug. 10, 2021

(54) ELECTRONIC DEVICE AND A METHOD FOR GENERATING AN IMAGE THROUGH SYNTHESIS OF DATE ACQUIRED USING A PLURALITY OF PIXELS HAVING DIFFERENT LIGHT-RECEIVING TIME DURATIONS

(71) Applicant: Samsung Electronics Co., Ltd., Suwon-si (KR)

(72) Inventors: Changwoo Lee, Suwon-si (KR); Dohan Kim, Suwon-si (KR); Jinmin Bang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/704,160

(22) Filed: Dec. 5, 2019

(65) Prior Publication Data

US 2020/0186697 A1 Jun. 11, 2020

(30) Foreign Application Priority Data

Dec. 7, 2018 (KR) .................. 10-2018-0157332

(51) Int. Cl.
*H04N 5/235* (2006.01)
*H04N 9/04* (2006.01)
*H04N 5/355* (2011.01)

(52) U.S. Cl.
CPC ......... *H04N 5/2355* (2013.01); *H04N 5/2356* (2013.01)

(58) Field of Classification Search
CPC .. H04N 5/2353; H04N 5/2355; H04N 5/3535; H04N 5/355; H04N 5/35536; H04N 5/35545; H04N 5/35554; H04N 5/35572; H04N 5/35581; H04N 5/2356; H04N 9/04557

See application file for complete search history.

(56) References Cited

U.S. PATENT DOCUMENTS 9,426,438 B2 8/2016 Furukawa et al.
9,699,429 B2 7/2017 Kaizu
(Continued)

FOREIGN PATENT DOCUMENTS

KR 10-2018-0074368 A 7/2018

OTHER PUBLICATIONS

International Search Report with Written Opinion dated Apr. 1, 2020; International Appln. No. PCT/KR2019/017118.

*Primary Examiner* — Albert H Cutler
(74) *Attorney, Agent, or Firm* — Jefferson IP Law, LLP

(57) ABSTRACT

An electronic device is provided that includes an image sensor of first pixels receiving light for a first duration and second pixels receiving light for a shorter second duration, and a processor to acquire first and second raw data including first long pixel values through the first pixels and first short pixel values through the second pixels, second long pixel values through the first pixels and second short pixel values through the second pixels, and third raw data based on the first and second raw data. The third raw data includes third long pixel values and third short pixel values, and each of the third long pixel values is an average value of a first and a second long pixel value and each of the third short pixel values is a value obtained by gamma correcting a sum of a first and a second short pixel value.

19 Claims, 9 Drawing Sheets

(56) References Cited

U.S. PATENT DOCUMENTS

| | | |
|---|---|---|
| 9,794,529 B2 | 10/2017 | Lee et al. |
| 10,200,664 B2 | 2/2019 | Kaizu |
| 2006/0245014 A1* | 11/2006 | Haneda ............... H04N 9/04515 358/512 |
| 2008/0253758 A1* | 10/2008 | Yap ..................... H04N 5/2351 396/234 |
| 2014/0168468 A1* | 6/2014 | Levoy .................. G06K 9/6212 348/229.1 |
| 2015/0029358 A1 | 1/2015 | Kaizu |
| 2015/0042848 A1 | 2/2015 | Furukawa et al. |
| 2015/0163422 A1* | 6/2015 | Fan ..................... H04N 5/3535 348/295 |
| 2015/0201118 A1* | 7/2015 | Lee ....................... H04N 5/374 348/222.1 |
| 2015/0244923 A1 | 8/2015 | Lee et al. |
| 2016/0037043 A1 | 2/2016 | Wang et al. |
| 2017/0171449 A1* | 6/2017 | Kino ................... H04N 5/2353 |
| 2017/0237905 A1* | 8/2017 | Molgaard ............... G06T 11/60 348/208.6 |
| 2017/0251188 A1 | 8/2017 | Kaizu |
| 2017/0302861 A1* | 10/2017 | Shibata ............. H04N 5/35581 |
| 2019/0364186 A1 | 11/2019 | Park et al. |

* cited by examiner

ELECTRONIC DEVICE AND A METHOD FOR GENERATING AN IMAGE THROUGH SYNTHESIS OF DATE ACQUIRED USING A PLURALITY OF PIXELS HAVING DIFFERENT LIGHT-RECEIVING TIME DURATIONS

CROSS-REFERENCE TO RELATED APPLICATION(S)

This application is based on and claims priority under 35 U.S.C. § 119(a) of a Korean patent application number 10-2018-0157332, filed on Dec. 7, 2018, in the Korean Intellectual Property Office, the disclosure of which is incorporated by reference herein its entirety.

BACKGROUND

1. Field

The disclosure relates to a technique for improving a dynamic range of an image by acquiring an improved HDR (high dynamic range) image using pixel values of a plurality of frames through a plurality of pixels having different light-receiving time durations.

2. Description of Related Art

Various techniques are used to improve a quality of an image obtained using a camera. For example, an electronic device may use a method of synthesizing a plurality of frames in order to improve a dynamic range of an image.

There is a method of improving such a dynamic range in one frame using an image sensor including a long pixel having a long light-receiving time duration and a short pixel having a short light-receiving time duration. However, image acquiring through the long pixel may have a larger noise compared to image acquiring through the short pixel. Further, image acquiring through the short pixel may have clipping in a bright portion or black clipping in a dark portion.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a device and method for acquiring an improved HDR (high dynamic range) image using pixel values of a plurality of frames through a plurality of pixels having different light-receiving time durations.

Additional aspects will be set forth in part in the description which follows and, in part, will be apparent from the description, or may be learned by practice of the presented embodiments.

In accordance with an aspect of the disclosure, an electronic device is provided. The electronic device includes an image sensor including a plurality of first pixels configured to receive light for a first time duration, and a plurality of second pixels configured to receive the light for a second time duration shorter than the first time duration.

In accordance with another aspect of the disclosure, the electronic device includes at least one processor, wherein the at least one processor is configured to sequentially acquire first raw data and second raw data from the image sensor, wherein the first raw data comprises first long pixel values acquired through the plurality of first pixels and first short pixel values acquired through the plurality of second pixels, and wherein the second raw data comprises second long pixel values acquired through the plurality of first pixels and second short pixel values acquired through the plurality of second pixels, and acquire third raw data based on the first raw data and the second raw data, wherein the third raw data includes third long pixel values and third short pixel values.

In accordance with another aspect of the disclosure, each of the third long pixel values is an average value of a first long pixel value and a second long pixel value corresponding to each third long pixel value among the first long pixel values and the second long pixel values.

In accordance with another aspect of the disclosure, each of the third short pixel values is a value obtained by gamma correcting a sum of a first short pixel value and a second short pixel value corresponding to each third short pixel value among the first short pixel values and the second short pixel values.

In accordance with another aspect of the disclosure, a method for acquiring a high dynamic range (HDR) image using an image sensor including a plurality of first pixels receiving light for a first time duration and a plurality of second pixels receiving light for a second time duration shorter than the first time duration is provided. The method includes acquiring a first image through the plurality of first pixels, acquiring a second image through a plurality of second pixels, acquiring a third image through the plurality of first pixels, acquiring a fourth image through the plurality of second pixels, acquiring a fifth image using pixel values of the first image and pixel values of the third image, wherein each of pixel values of the fifth image is an average value of a corresponding pixel value of the first image and a corresponding pixel value of the third image, acquiring a sixth image using pixel values of the second image and pixel values of the fourth image, wherein each of pixel values of the sixth image is a value obtained by gamma correcting a sum of a corresponding pixel value of the second image and a corresponding pixel value of the fourth image and acquiring a seventh image using the fifth image and the sixth image.

In accordance with another aspect of the disclosure, an electronic device is provided. The electronic device includes an image sensor comprising a plurality of first pixels configured to receive light for a first time duration, and a plurality of second pixels configured to receive the light for a second time duration shorter than the first time duration.

In accordance with another aspect of the disclosure, the electronic device includes at least one processor, wherein the at least one processor is configured to sequentially acquire a first image and a second image using the image sensor, wherein the first image comprises first pixel values corresponding to the first pixels and second pixel values corresponding to the second pixels, and wherein the second image comprises third pixel values corresponding to the first pixels and fourth pixel values corresponding to the second pixels, combine the first pixel values and the third pixel values using a first image processing scheme to generate first composite data, combine the second pixel values and the fourth pixel values using a second image processing scheme to generate second composite data and generate a third image using the first composite data and the second composite data, wherein the third image corresponds to a combined image of the first image and the second image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that modification, equivalent, and/or alternative on the various embodiments described herein can be variously made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
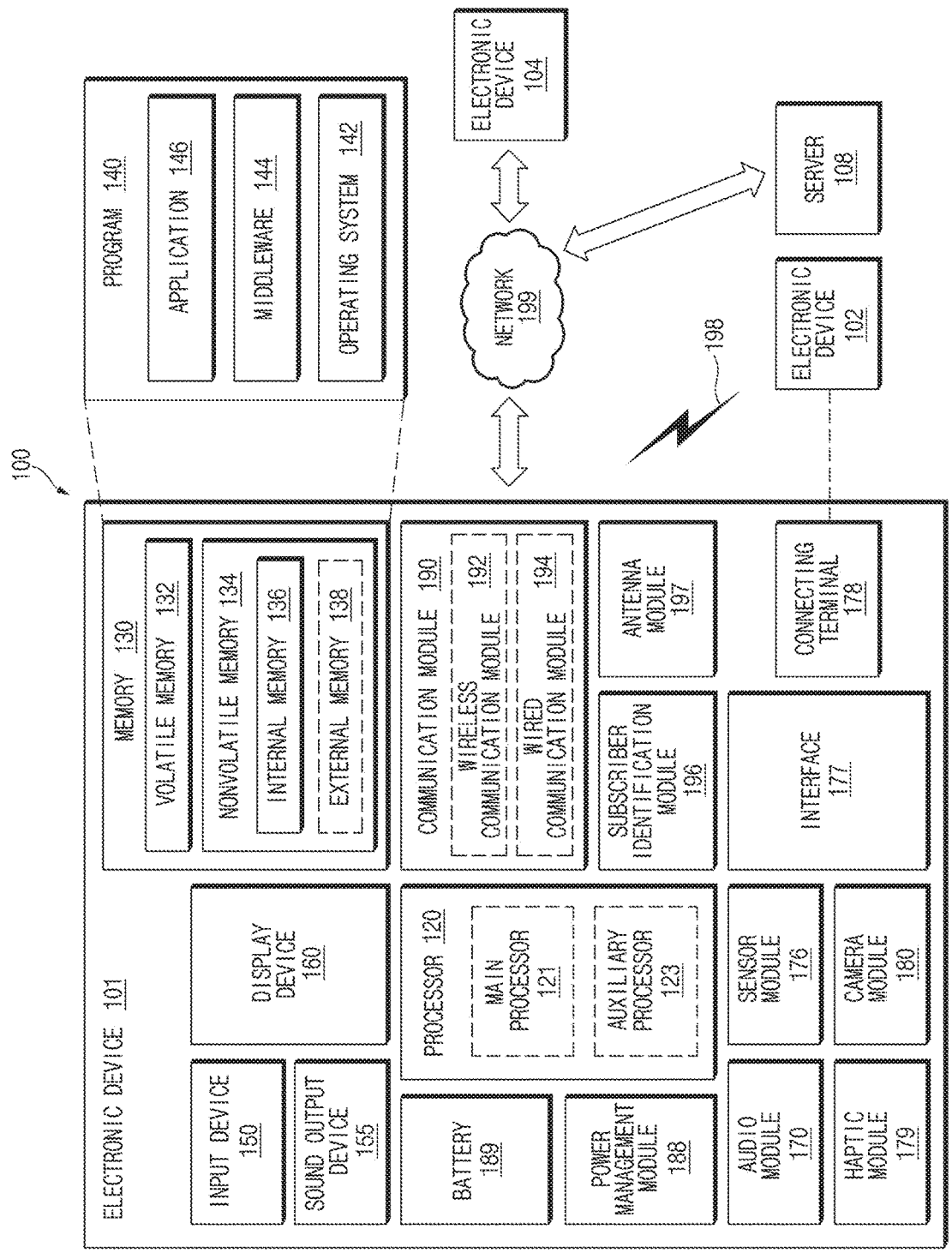
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include at least one processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, and/or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., the electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
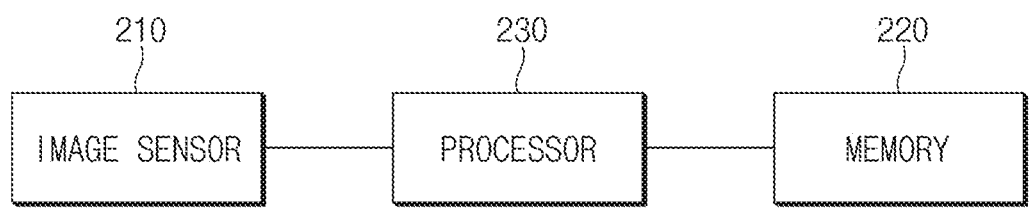
FIG. 2 is another block diagram of an electronic device according to an embodiment of the disclosure.

FIG. 2 is another block diagram of an electronic device according to an embodiment of the disclosure.

Referring to FIG. 2, the electronic device may include an image sensor 210 (e.g., the camera module 180 of FIG. 1), a memory 220 (e.g., the memory 130 of FIG. 1), and at least one processor 230 (e.g., the processor 120 of FIG. 1).

The image sensor 210 may generate an electrical signal in response to light incident from an outside. Digital image data may be generated based on the electrical signal.

The image sensor 210 may include a pixel array in which a plurality of unit pixels are two-dimensionally arranged in a lattice shape. The pixel array may include a few to tens of millions of unit pixels, and each of the pixels may correspond to one of a plurality of reference colors. For example, the plurality of reference colors may include R, G, and B (red, green, blue), or R, G, B, and W (red, green, blue, white). A color corresponding to each of the pixels may be in accordance with a designated pattern (e.g., a Bayer pattern). The image sensor 210 may be implemented using, for example, a charge-coupled device (CCD) or a complementary metal-oxide-semiconductor (CMOS).

Figure 3:
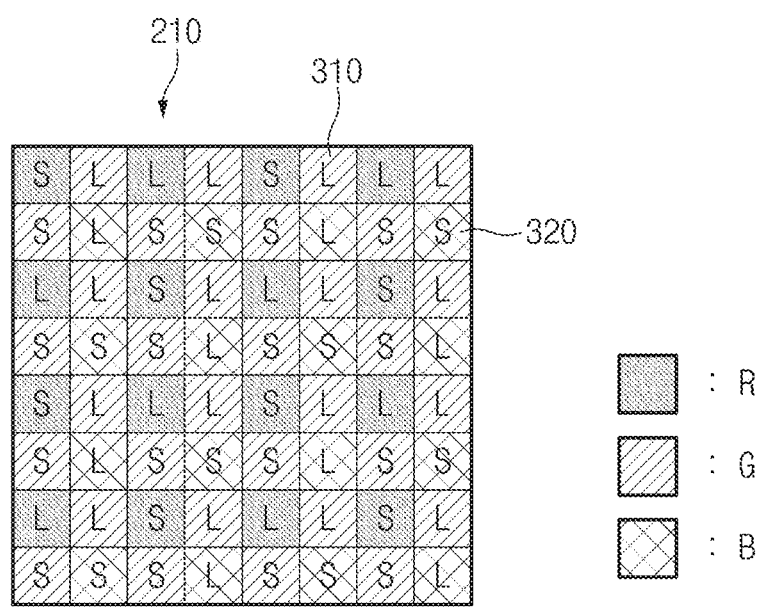
FIG. 3 is a diagram illustrating a pixel arrangement of an image sensor of an electronic device according to an embodiment of the disclosure.

According to one embodiment, the image sensor 210 may include a plurality of pixels having different light-receiving time durations, as shown in FIG. 3.

FIG. 3 is a diagram illustrating a pixel arrangement of an image sensor of an electronic device according to an embodiment of the disclosure. A hatching pattern for each pixel in FIG. 3 may represent a color corresponding to each pixel.

Referring to FIG. 3, the image sensor 210 may include a plurality of long exposure pixels (LEP) 310 (denoted as 'L' in FIG. 3) and a plurality of short exposure pixels (SEP) 320 (denoted as 'S' in FIG. 3). The long exposure pixel 310 may be configured to receive light for a first time duration (light-receiving time duration of the long exposure pixel 310) in response to an input associated with image acquiring. The short exposure pixel 320 may be configured to receive light for a second time duration shorter (light-receiving time duration of the short exposure pixel 320) than the first time duration in response to an input associated with image acquiring. For example, the long exposure pixel 310 may receive light for about 1/60 second (the first time duration), while the short exposure pixel 320 may receive light for about 1/500 second (the second time duration). The plurality of long exposure pixels 310 and the plurality of short exposure pixels 320 may be arranged in a repeated pattern or may be arranged in an irregular pattern. The second time duration may correspond to (equal to) a value obtained by dividing a predefined proper shutter speed by the number of the first raw data and the second raw data used for acquiring the third raw data. The appropriate shutter speed may be determined, for example, experimentally, based on characteristics of the image sensor 210.

According to an embodiment of the disclosure, the image sensor 210 may transfer raw data including pixel values acquired through the plurality of long exposure pixels and the plurality of short exposure pixels to the processor 230.

According to one embodiment, the image sensor 210 may include a compressor for compressing raw data. The image sensor 210 may compress the raw data using the compressor and transfer the compressed raw data to the processor 230.

According to one embodiment, the image sensor 210 may compress at least a portion of the raw data as sequentially acquired and may not compress a remaining portion thereof. For example, the image sensor 210 may compress first raw data and transmit the compressed first raw data to the processor 230, while the image sensor 210 may not compress second raw data acquired next to the first raw data and may transfer the same to the processor 230. According to an embodiment, the image sensor 210 may compress and transfer all of the acquired raw data to the processor 230.

Referring back to FIG. 2, the memory 220 (e.g., the memory 130) may store commands, information, or data associated with operations of the components 210 and 230 included in the electronic device. For example, the memory 220 may store instructions that, when being executed, cause the processor 230 to perform various operations as described in the disclosure.

The processor 230 (e.g., the processor 120) may execute the instructions stored in the memory 220 to perform various operations as described in the disclosure.

According to one embodiment, the processor 230 may further include a decompressor for decompressing the compressed raw data.

Hereinafter, it may be assumed that the electronic device of FIG. 2 performs a process of FIG. 4A and FIG. 4B. Operations described as being performed by the electronic device may be implemented using instructions that may be performed (or executed) by the processor 230 of the electronic device. The instructions may be stored in, for example, a computer recording medium or the memory 220 of the electronic device shown in FIG. 2.

According to one embodiment, the image sensor 210 of the electronic device may include a plurality of first pixels configured to receive light for a first time duration and a plurality of second pixels configured to receive light for a second time duration shorter than the first time duration.

Figure 4A:
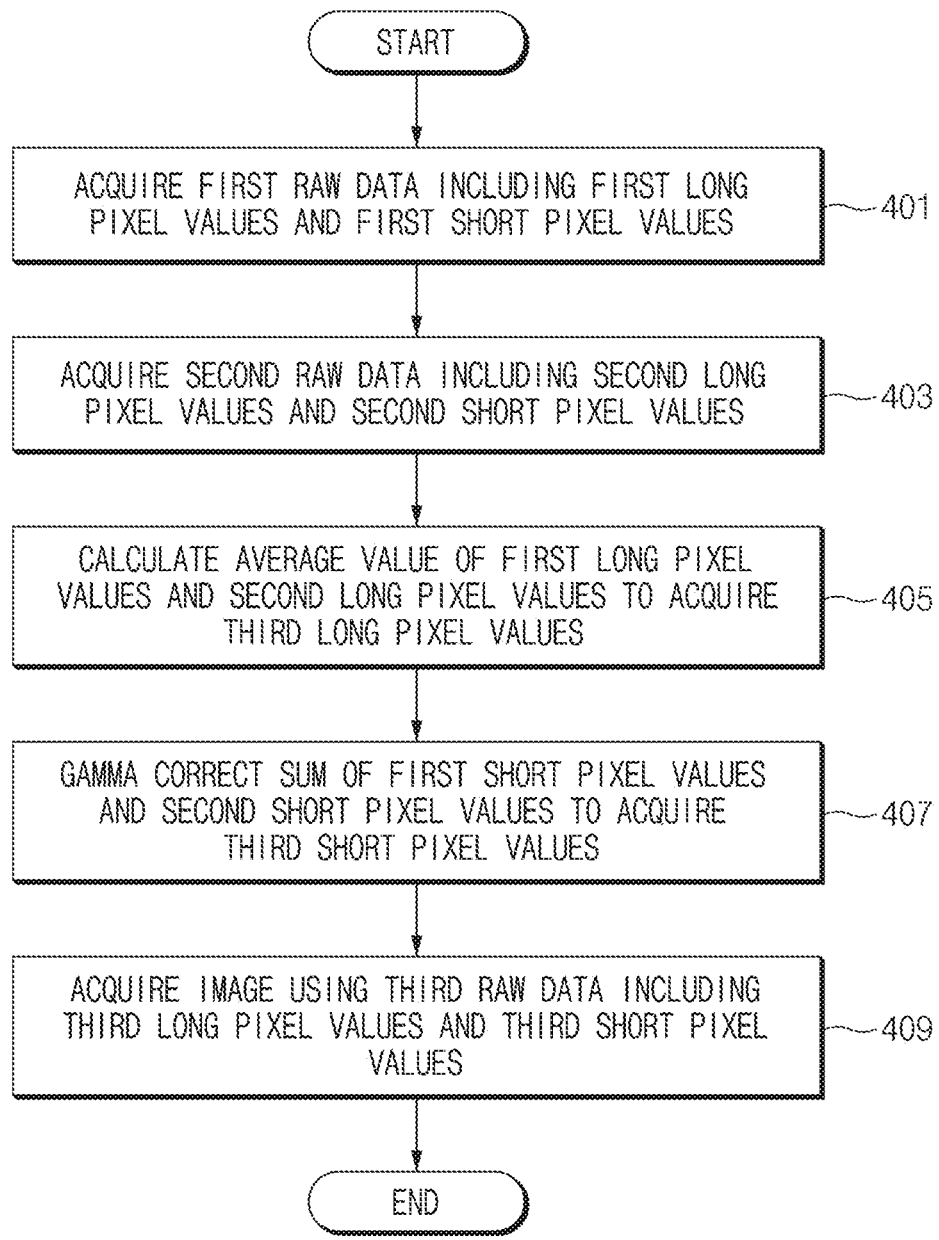
FIG. 4A is a flowchart illustrating a method of acquiring an image by an electronic device according to an embodiment of the disclosure.

FIG. 4A is a flowchart illustrating a method of acquiring an image by an electronic device according to an embodiment of the disclosure.

Referring to FIG. 4A, in operation 401, the processor 230 may acquire first raw data including first long pixel values and first short pixel values from the image sensor 210. The first long pixel values may be acquired through the plurality of first pixels (e.g., the long exposure pixels 310), while the first short pixel values may be acquired through the plurality of second pixels (e.g., short exposure pixels 320).

In operation 403, the processor 230 may acquire second raw data including second long pixel values and second short pixel values from the image sensor 210. The second long pixel values may be acquired through the plurality of first pixels, while the second short pixel values may be acquired through the plurality of second pixels.

According to an embodiment, the processor 230 may acquire compressed first raw data in operation 401, and may acquire uncompressed second raw data in operation 403 from the image sensor 210. The processor 230 may decompress the compressed first raw data and may perform following operation 405 and operation 407 based on the decompressed first raw data and second raw data.

According to an embodiment, the processor 230 may acquire the compressed first raw data through the image sensor 210 in operation 401, and may acquire compressed second raw data in operation 403. The processor 230 may decompress the compressed first raw data and the compressed second raw data and then may perform following operations 405 and operation 407 based on the decompressed first raw data and decompressed second raw data.

In operations 405 and operation 407, the processor 230 may acquire third raw data including the third long pixel values and third short pixel values based on the first raw data and the second raw data.

In operation 405, the processor 230 may calculate an average of the first long pixel values and the second long pixel values to acquire the third long pixel values.

For example, each third long pixel value as acquired may be an average value of a corresponding first long pixel value and a corresponding second long pixel value.

In operation 407, the processor 230 may perform gamma-correct on a sum of the first short pixel values and the second short pixel values to acquire the third short pixel values.

For example, each third short pixel value may be a value obtained by gamma correcting a sum of a first short pixel value corresponding to each third short pixel value and a second short pixel value corresponding to each third short pixel value.

According to an embodiment, the gamma correction may be a bicubic gamma correction. The bicubic gamma correction may extract some pixel values of the third short pixel values through, for example, bicubic filtering, and may perform gamma correction on the first short pixel value and the second short pixel value corresponding to the extracted some pixel values and then may apply a bicubic interpolation thereto. Thus, in one embodiment, an amount of calculation for gamma correction may be reduced.

According to an embodiment, the processor 230 may perform white balance correction on the sum of the first short pixel value and the corresponding second short pixel value before the gamma correction. The processor 230 may perform the gamma correction on the white balance corrected value and may perform inverse white balance correction on the gamma corrected value to acquire the third short pixel values. For example, the processor 230 may perform the white balance correction on the sum of the first short pixel value and the corresponding second short pixel value using a predefined first parameter value and, then, perform the gamma correction on the white balance corrected value, and then perform the inverse white balance correction on the gamma corrected value using a predefined second parameter value. The first parameter and the second parameter may be defined to prevent, for example, white balance distortion due to the gamma correction.

In operation 409, the processor 230 may acquire an image using the third raw data that includes the third long pixel values and third short pixel values.

According to an embodiment, the processor 230 may acquire an image (e.g., HDR image) by performing interpolation on the third long pixel values and third short pixel values.

According to various embodiments, the processor 230 may acquire the third raw data further based on at least one fourth raw data. For example, the processor 230 may acquire the first raw data and second raw data and then may acquire the fourth raw data (corresponding to at least one fourth raw data) including fourth long pixel values acquired through the plurality of first pixels and fourth short pixel values acquired through the plurality of second pixels from the image sensor. The processor 230 may acquire fifth raw data (substituting the third raw data) including fifth long pixel values and fifth short pixel values based on the first raw data, the second raw data and the fourth raw data. Each of the fifth long pixel values may be an average value of a first long pixel value, a second long pixel value, and a third long pixel value corresponding to each fifth long pixel value among the first long pixel values, the second long pixel values, and the third long pixel values. Each of the fifth short pixel values may be a value obtained by performing the gamma correction on a sum of a first short pixel value, a second short pixel value, and a third short pixel value corresponding to each of the fifth short pixel values among the first short pixel values, the second short pixel values, and the third short pixel values. In this case, the second time duration may be adjusted to correspond to a value obtained by dividing a predefined appropriate shutter speed by the total number of the first raw data, the second raw data, and the at least one raw data.

Figure 4B:
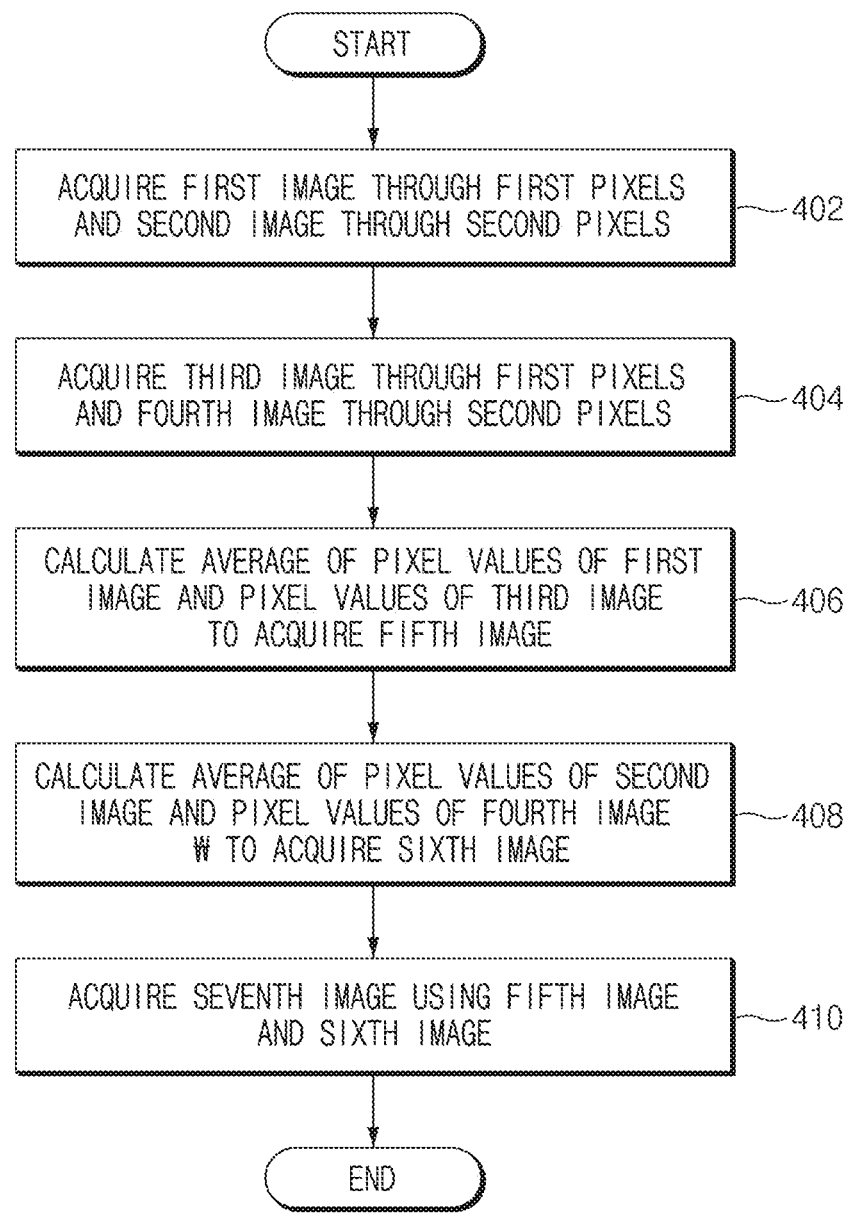
FIG. 4B is a flowchart illustrating a method for acquiring an image by an electronic device according to another embodiment of the disclosure.

FIG. 4B is a flowchart illustrating a method for acquiring an image by an electronic device according to another embodiment of the disclosure.

Referring to FIG. 4B, in operation 402, the processor 230 may acquire a first image through the first pixels (e.g., long exposure pixel 310) and acquire a second imager through the second pixels (e.g., short exposure pixel 320).

According to an embodiment, the processor 230 may acquire first raw data including first long pixel values and first short pixel values through the image sensor 210. The first long pixel values may be acquired through a plurality of first pixels, while the first short pixel values may be acquired through a plurality of second pixels. The processor 230 may acquires the first image by performing interpolation on the first long pixel values. The processor 230 may acquire the second image by performing interpolation on the first short pixel values.

According to an embodiment, in operation 402, the processor 230 may acquire compressed first raw data from the image sensor 210. The processor 230 may decompress the compressed first raw data, and acquire the first image and the second image using the decompressed first raw data.

In operation 404, the processor 230 may acquire a third image through the first pixels and acquire a fourth image through the second pixels.

According to an embodiment, the processor 230 may acquire second raw data including second long pixel values and second short pixel values through the image sensor 210. The second long pixel values may be acquired through a plurality of first pixels, while the second short pixel values may be acquired through a plurality of second pixels. The processor 230 may acquire a third image by performing interpolation on the second long pixel values. The processor 230 may acquire a fourth image by performing interpolation on the second short pixel values.

According to an embodiment, the processor 230 may acquire compressed second raw data from the image sensor 210 in operation 404. The processor 230 may decompress the compressed second raw data, and then may acquire the third image and the fourth image using the decompressed second raw data.

In operation 406, the processor 230 may acquire a fifth image by calculating an average of pixel values of the first image and pixel values of the third image. For example, each pixel value of the fifth image may be an average value of a corresponding pixel value of the first image and a corresponding pixel value of the third image.

In operation 408, the processor 230 may acquire a sixth image by gamma correcting a sum of pixel values of the second image and pixel values of the fourth image. For example, each pixel value of the sixth image may be a value obtained by gamma correcting a sum of a corresponding pixel value of the second image and a corresponding pixel value of the fourth image.

According to an embodiment, the gamma correction may be a bicubic gamma correction.

According to an embodiment of the disclosure, the processor 230 may perform white balance correction on the sum of the corresponding pixel value of the second image and the corresponding pixel value of the fourth image before the gamma correction. The processor 230 may perform gamma correction on the white balance corrected value and may perform inverse white balance correction to the gamma corrected value to acquire pixel values of the sixth image.

In operation 410, the processor 230 may acquire a seventh image using the fifth image and the sixth image.

According to an embodiment, the processor 230 may acquire the seventh image by applying HDR correction to the fifth image and the sixth image.

Hereinafter, the above-described operation 401 to operation 407 will be described again with reference to FIG. 5.

Figure 5:
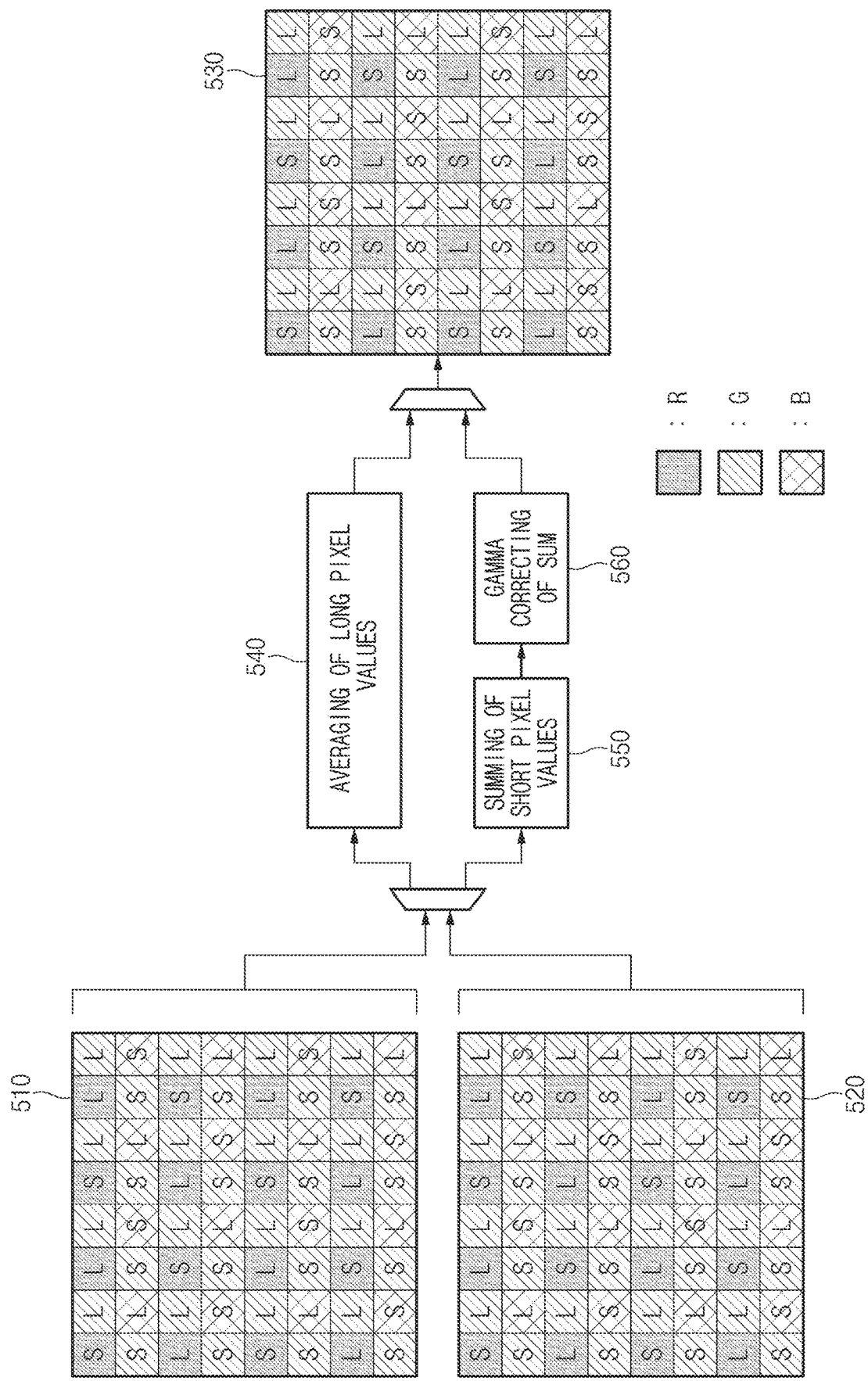
FIG. 5 is a diagram showing a process of processing raw data acquired through an image sensor according to an embodiment of the disclosure.

FIG. 5 is a diagram illustrating a process of processing raw data acquired through an image sensor according to an embodiment of the disclosure.

Referring to FIGS. 2, 4A and 5, in operation 401, the processor 230 may acquire first raw data 510 including first long pixel values and first short pixel values from the image sensor 210.

In operation 403, the processor 230 may acquire second raw data 520 including second long pixel values and second short pixel values from the image sensor 210.

In operation 405, the processor 230 may acquire an average of the first long pixel values and the second long pixel values at module 540.

In operation 407, the processor 230 may sum the first short pixel values and second short pixel values at module 550, and may perform gamma correction on the sum value at module 560.

According to an embodiment, the processor 230 may simultaneously perform operation 405 and operation 407, and may acquire third raw data 530 by performing operation 405 and operation 407.

Hereinafter, processing of pixel values acquired through second pixels (e.g., short exposure pixel 320) having a short light-receiving time duration will be described with reference to FIGS. 6A to 6C.

In an embodiment, the pixel value processed by the processor 230 for final image acquisition may be assumed to have a value of 0 to 1023.

Figure 6A:
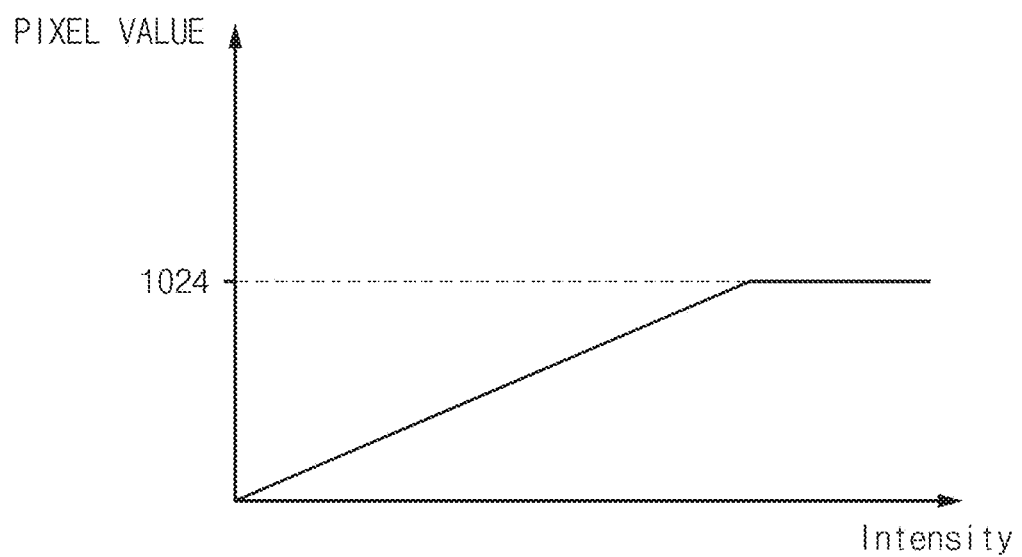
FIG. 6A is a graph showing an output pixel value based on intensity of light received by a second pixel of an image sensor according to an embodiment of the disclosure.

FIG. 6A is a graph showing an output pixel value based on intensity of light received by a second pixel of an image sensor according to an embodiment of the disclosure.

Figure 6B:
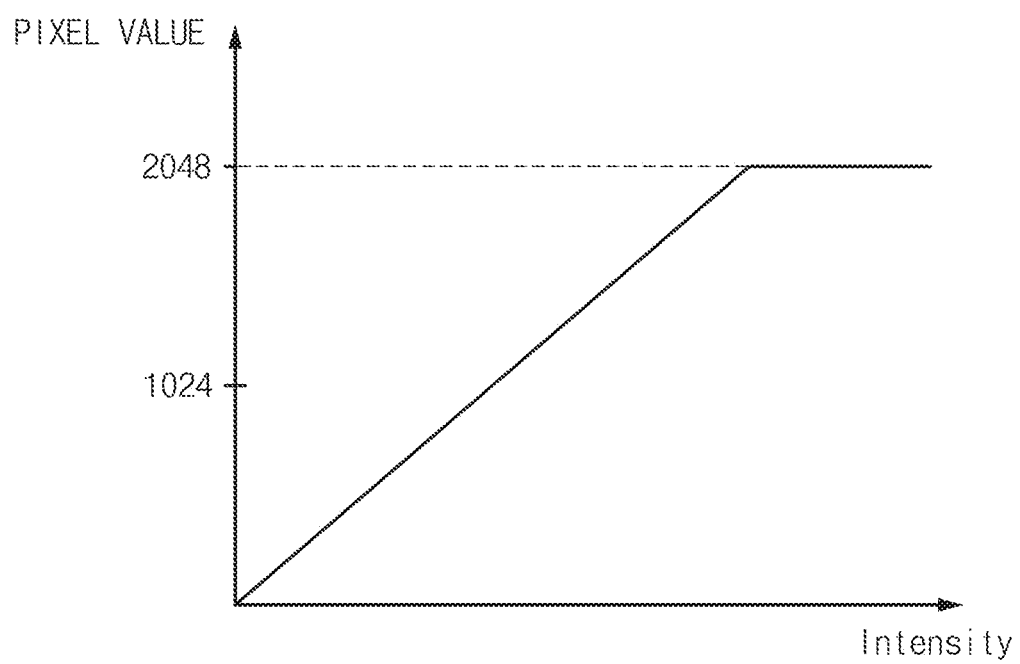
FIG. 6B is a graph showing a sum of two pixel values sequentially acquired through a second pixel based on intensity of light according to an embodiment of the disclosure.

FIG. 6B is a graph showing a sum of two pixel values sequentially acquired through a second pixel based on intensity of light according to an embodiment of the disclosure.

Figure 6C:
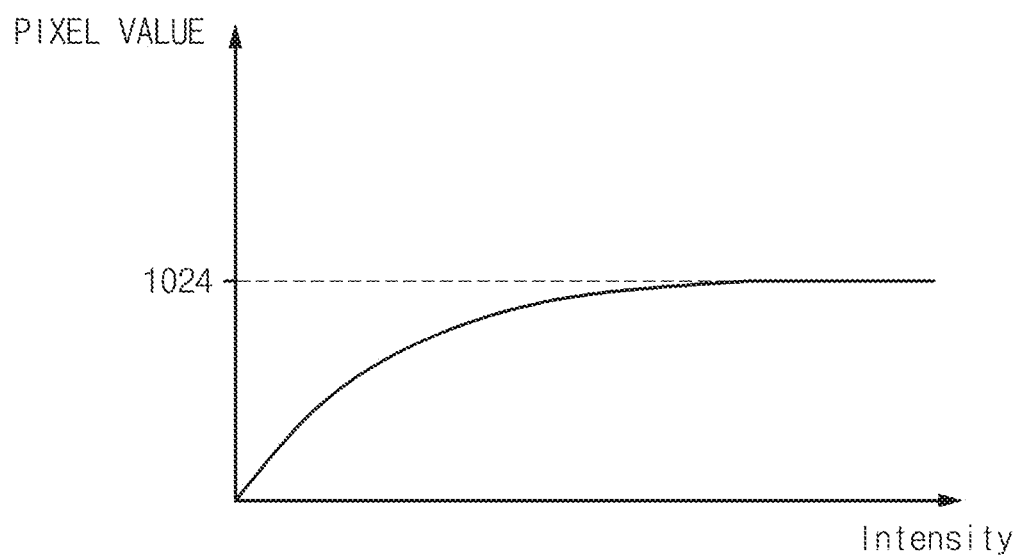
FIG. 6C is a graph showing a gamma corrected value of a sum of two pixel values according to an embodiment of the disclosure.

FIG. 6C is a graph showing a gamma corrected value of a sum of two pixel values sequentially acquired through a second pixel according to an embodiment of the disclosure.

According to an embodiment, an interface between the image sensor 210 and the processor 230 may be configured to transmit/receive parallel 10-bits data (e.g., raw data). In contrast, the image sensor 210 may be configured to acquire data (pixel value) of greater than 10 bits, for example, of about 12 bits.

Referring to FIG. 6A, the greater an intensity of light received by the second pixel, the larger the pixel value output by the second pixel. The interface may allow the pixel value that the processor 230 may identify from the raw data to be white clipped at 1024.

Referring to FIG. 6B, because a maximum value of each of the two pixel values sequentially acquired through the second pixel of the image sensor 210 is 1024, the sum of the two pixel values is white clipped at 2048.

Because a maximum value of the pixel value that the processor 230 may process for image acquisition is 1024, the processor 230 may not use the sum value as it is. In order to use the sum, the processor 230 may perform gamma-correct on the sum of the pixel values such that a maximum value of the corrected value is 1024.

Referring to FIG. 6C, the processor 230 may perform gamma-correct on the sum of pixel values that may be shown as in FIG. 6B to convert the sum to a value that may be shown as in FIG. 6C. The maximum value of the gamma corrected value is 1024. As the light intensity increases, the corrected value also increases. Thus, the processor 230 may acquire a pixel value with minimized white clipping.

According to one embodiment, the electronic device (e.g., electronic device 101 of FIG. 1) may include the image sensor (e.g., image sensor 210 of FIG. 2) including a plurality of first pixels (e.g., long exposure pixel 310 of FIG. 3) receiving light for a first time duration and a plurality of second pixels (e.g., short exposure pixel 320 in FIG. 3) receiving the light for a second time duration shorter than the first time duration; and at least one processor (e.g., processor 230 of FIG. 2), wherein the at least one processor is configured to: sequentially acquire first raw data and second raw data from the image sensor, wherein the first raw data includes first long pixel values acquired through the plurality of first pixels and first short pixel values acquired through the plurality of second pixels, wherein the second raw data includes second long pixel values acquired through the plurality of first pixels and second short pixel values acquired through the plurality of second pixels; and acquire third raw data based on the first raw data and the second raw data, wherein the third raw data includes third long pixel values and third short pixel values, wherein each of the third long pixel values is an average value of a first long pixel value and a second long pixel value corresponding to each third long pixel value among the first long pixel values and the second long pixel values, wherein each of the third short pixel values is a value obtained by gamma correcting a sum of a first short pixel value and a second short pixel value corresponding to each third short pixel value among the first short pixel values and the second short pixel values.

The second time duration corresponds to a value obtained by dividing a predefined appropriate shutter speed by a number of the first raw data and the second raw data used to acquire the third raw data, wherein when the at least one processor acquires the third raw data further based on at least one fourth raw data, the second time duration is adjusted to correspond to a value obtained by dividing the appropriate shutter speed by a total number of the first raw data, the second raw data, and the at least one raw data.

The at least one processor may be configured to acquire an image using the third raw data.

The gamma correction may be a bicubic gamma correction.

The at least one processor may be configured to: perform white balance correction on a sum of the first short pixel value and the second short pixel value corresponding to the first short pixel value; perform gamma correction on the white balance corrected value; and perform inverse white balance correction on the gamma corrected value to acquire the third short pixel values.

The at least one processor may be configured to: acquire the first raw data compressed using the image sensor; decompress the compressed first raw data; and acquire the third raw data based on the decompressed first raw data and the second raw data.

The at least one processor may be configured to: acquire the first raw data and the second raw data compressed using the image sensor; decompress the compressed first raw data and second raw data; and acquire the third raw data based on the decompressed first raw data and the decompressed second raw data.

In one embodiment, a method for acquiring a high dynamic range (HDR) image using an image sensor (e.g., image sensor 210 in FIG. 2) including a plurality of first pixels (e.g., long exposure pixels 310 in FIG. 3) receiving light for a first time duration and a plurality of second pixels (e.g., short exposure pixels 320 in FIG. 3) receiving light for a second time duration shorter than the first time duration may include acquiring a first image through the plurality of first pixels and a second image through a plurality of second pixels; acquiring a third image through the plurality of first pixels and a fourth image through the plurality of second pixels; acquiring a fifth image using pixel values of the first image and pixel values of the third image, wherein each of pixel values of the fifth image is an average value of a corresponding pixel value of the first image and a corresponding pixel value of the third image; acquiring a sixth image using pixel values of the second image and pixel values of the fourth image, wherein each of pixel values of the sixth image is a value obtained by gamma correcting a sum of a corresponding pixel value of the second image and a corresponding pixel value of the fourth image; and acquiring a seventh image using the fifth image and the sixth image.

The gamma correction may be a bicubic gamma correction.

The acquiring of the sixth image may include: performing white balance correction on a sum of a pixel value of the second image and a corresponding pixel value of a the fourth image; performing gamma correction on the white balance corrected value; and performing inverse white balance correction on the gamma corrected value to acquire pixel values of the sixth image.

The acquiring of the first image and the second image may include: acquiring first raw data including first long pixel values acquired through the plurality of first pixels and first short pixel values acquired through the plurality of second pixels; and applying interpolation to the first long pixel values to acquire the first image, and applying interpolation to the first short pixel values to acquire the second image.

The acquiring of the third image and the fourth image may include: acquiring second raw data including second long pixel values acquired through the plurality of first pixels and second short pixel values acquired through the plurality of second pixels; and applying interpolation to the first long pixel values to acquire the first image and applying interpolation to the first short pixel values to acquire the second image.

In one embodiment, an electronic device (e.g., electronic device 101 in FIG. 1) may include an image sensor (e.g., image sensor 210 in FIG. 2) including a plurality of first pixels (e.g., long exposure pixels 310 in FIG. 3) receiving light for a first time duration and a plurality of second pixels (e.g., short exposure pixels 320 in FIG. 3) receiving the light for a second time duration shorter than the first time duration; and at least one processor, wherein the at least one processor is configured to: sequentially acquire a first image and a second image using the image sensor, wherein the first image includes first pixel values corresponding to the first pixels and second pixel values corresponding to the second pixels, and the second image includes third pixel values corresponding to the first pixels and fourth pixel values corresponding to the second pixels; combine the first pixel values and the third pixel values using a first image processing scheme to generate first composite data; combine the second pixel values and the fourth pixel values using a second image processing scheme to generate second composite data; and generate a third image using the first composite data and the second composite data, wherein the third image corresponds to a combined image of the first image and the second image.

The first image processing scheme may calculate an average value of each first pixel value and each third pixel value.

The second image processing scheme may perform gamma correction on a sum of each second pixel value and each fourth pixel value.

The gamma correction may be a bicubic gamma correction.

The second image processing scheme may perform white balance correction on a sum of each second pixel value and each fourth pixel value and perform gamma correction on the white balance corrected value, and perform inverse white balance correction on the gamma corrected value.

The image sensor may compress the first pixel values and the second pixel values, wherein the at least one processor is configured to: decompress the compressed first pixel values and second pixel values; generate the first composite data using the decompressed first pixel values and the third pixel values; generate the second composite data using the decompressed second pixel values and the fourth pixel values; and generate the third image using the first composite data and the second composite data, wherein the third image corresponds to a combined image of the first image and the second image.

The image sensor may compress the first pixel values, the second pixel values, the third pixel values, and the fourth pixel values, wherein the at least one processor is configured to: decompress the compressed first pixel values, second pixel values, third pixel values, and fourth pixel values; generate the first composite data using the decompressed first pixel values and the decompressed third pixel values; generate the second composite data using the decompressed second pixel values and the decompressed fourth pixel values; and generate the third image using the first composite data and the second composite data, wherein the third image corresponds to a combined image of the first image and the second image.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The embodiments as disclosed in the disclosure may improve the dynamic range of the image using the raw data of the plurality of frames.

In addition, various effects may be provided that are directly or indirectly identified in the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   an image sensor comprising:
      a plurality of first pixels configured to receive light for a first time duration, and a plurality of second pixels configured to receive light for a second time duration shorter than the first time duration; and at least one processor, wherein the at least one processor is configured to:

sequentially acquire first raw data and second raw data from the image sensor, wherein the first raw data comprises first long pixel values acquired through the plurality of first pixels and first short pixel values acquired through the plurality of second pixels, and wherein the second raw data comprises second long pixel values acquired through the plurality of first pixels and second short pixel values acquired through the plurality of second pixels, and acquire third raw data based on the first raw data and the second raw data, wherein the third raw data includes third long pixel values and third short pixel values, wherein each of the third long pixel values is an average value of a first long pixel value and a second long pixel value corresponding to each third long pixel value among the first long pixel values and the second long pixel values, and wherein each of the third short pixel values is a value obtained by gamma correcting a sum of a first short pixel value and a second short pixel value corresponding to each third short pixel value among the first short pixel values and the second short pixel values.

2. The electronic device of claim 1,
wherein the second time duration corresponds to a value obtained by dividing a predefined appropriate shutter speed by a number of the first raw data and the second raw data used to acquire the third raw data, and
wherein, when the at least one processor acquires the third raw data further based on at least one fourth raw data, the second time duration is adjusted to correspond to a value obtained by dividing the appropriate shutter speed by a total number of the first raw data, the second raw data, and the at least one fourth raw data.

3. The electronic device of claim 1, wherein the at least one processor is further configured to acquire an image using the third raw data.

4. The electronic device of claim 1, wherein the gamma correction is a bicubic gamma correction.

5. The electronic device of claim 1, wherein the at least one processor is further configured to:
perform white balance correction on a sum of the first short pixel value and the second short pixel value corresponding to the first short pixel value,
perform gamma correction on the white balance corrected value, and
perform inverse white balance correction on the gamma corrected value to acquire the third short pixel values.

6. The electronic device of claim 1, wherein the at least one processor is further configured to:
acquire the first raw data compressed using the image sensor,
decompress the compressed first raw data, and
acquire the third raw data based on the decompressed first raw data and the second raw data.

7. The electronic device of claim 1, wherein the at least one processor is further configured to:
acquire the first raw data and the second raw data compressed using the image sensor,
decompress the compressed first raw data and second raw data, and
acquire the third raw data based on the decompressed first raw data and the decompressed second raw data.

8. The electronic device of claim 1, wherein the image sensor comprises:
a plurality of long exposure pixels (LEPs); and
a plurality of short exposure pixels (SEPs).

9. A method for acquiring a high dynamic range (HDR) image using an image sensor including a plurality of first pixels receiving light for a first time duration and a plurality of second pixels receiving light for a second time duration shorter than the first time duration, the method comprising:
acquiring a first image through the plurality of first pixels;
acquiring a second image through a plurality of second pixels;
acquiring a third image through the plurality of first pixels;
acquiring a fourth image through the plurality of second pixels;
acquiring a fifth image using pixel values of the first image and pixel values of the third image,
wherein each of pixel values of the fifth image is an average value of a corresponding pixel value of the first image and a corresponding pixel value of the third image;
acquiring a sixth image using pixel values of the second image and pixel values of the fourth image,
wherein each of pixel values of the sixth image is a value obtained by gamma correcting a sum of a corresponding pixel value of the second image and a corresponding pixel value of the fourth image; and
acquiring a seventh image using the fifth image and the sixth image.

10. The method of claim 9, wherein the gamma correction is a bicubic gamma correction.

11. The method of claim 9, wherein the acquiring of the sixth image further comprises:
performing white balance correction on a sum of a pixel value of the second image and a corresponding pixel value of the fourth image;
performing gamma correction on the white balance corrected value; and
performing inverse white balance correction on the gamma corrected value to acquire pixel values of the sixth image.

12. The method of claim 9, wherein the acquiring of the first image and the second image further comprises:
acquiring first raw data including first long pixel values acquired through the plurality of first pixels and first short pixel values acquired through the plurality of second pixels;
applying interpolation to the first long pixel values to acquire the first image; and
applying interpolation to the first short pixel values to acquire the second image.

13. The method of claim 9, wherein the acquiring of the third image and the fourth image further comprises:
acquiring second raw data including second long pixel values acquired through the plurality of first pixels and second short pixel values acquired through the plurality of second pixels;
applying interpolation to the second long pixel values to acquire the first image; and
applying interpolation to the first short pixel values to acquire the second image.

14. An electronic device comprising:
an image sensor comprising:
a plurality of first pixels configured to receive light for a first time duration, and
a plurality of second pixels configured to receive light for a second time duration shorter than the first time duration; and
at least one processor, wherein the at least one processor is configured to:
sequentially acquire a first image and a second image using the image sensor, wherein the first image comprises first long pixel values corresponding to the first pixels and second short pixel values corresponding to the second pixels, and wherein the second image comprises third long pixel values corresponding to the first pixels and fourth short pixel values corresponding to the second pixels,
combine the first long pixel values and the third long pixel values using a first image processing scheme to generate first composite data,
combine the second short pixel values and the fourth short pixel values using a second image processing scheme to generate second composite data, and
generate a third image using the first composite data and the second composite data,
wherein the third image corresponds to a combined image of the first image and the second image, and
wherein the second image processing scheme is configured to perform gamma correction on a sum of each second short pixel value and each fourth short pixel value.

15. The electronic device of claim 14, wherein the first image processing scheme is configured to calculate an average value of each first long pixel value and each third long pixel value.

16. The electronic device of claim 14, wherein the gamma correction is a bicubic gamma correction.

17. The electronic device of claim 14, wherein the second image processing scheme is further configured to:
perform white balance correction on a sum of each second short pixel value and each fourth short pixel value,
perform gamma correction on the white balance corrected value, and
perform inverse white balance correction on the gamma corrected value.

18. The electronic device of claim 14,
wherein the image sensor is configured to compress the first long pixel values and the second short pixel values,
wherein the at least one processor is further configured to:
decompress the compressed first long pixel values and second short pixel values,
generate the first composite data using the decompressed first long pixel values and the third long pixel values,
generate the second composite data using the decompressed second short pixel values and the fourth short pixel values, and
generate the third image using the first composite data and the second composite data, and
wherein the third image corresponds to a combined image of the first image and the second image.

19. The electronic device of claim 14,
wherein the image sensor is further configured to compress the first long pixel values, the second short pixel values, the third long pixel values, and the fourth short pixel values,
wherein the at least one processor is further configured to:
decompress the compressed first long pixel values, second short pixel values, third long pixel values, and fourth short pixel values,
generate the first composite data using the decompressed first long pixel values and the decompressed third long pixel values,
generate the second composite data using the decompressed second short pixel values and the decompressed fourth short pixel values, and
generate the third image using the first composite data and the second composite data, and
wherein the third image corresponds to a combined image of the first image and the second image.

* * * * *